United States Patent [19]

Braun

[11] 4,123,191
[45] Oct. 31, 1978

[54] MULTI-SPINDLE DRILL HEAD

[75] Inventor: Erwin Braun, Stuttgart, Germany

[73] Assignee: Sigloch and Schrieder, Germany

[21] Appl. No.: 818,751

[22] Filed: Jul. 25, 1977

[30] Foreign Application Priority Data

Jul. 27, 1976 [DE] Fed. Rep. of Germany ....... 2633660

[51] Int. Cl.² .......................... B23B 47/14; B23B 39/16
[52] U.S. Cl. ........................................ 408/42; 408/124
[58] Field of Search ................. 408/25, 31, 42–43, 408/53, 124; 74/665 GA

[56] References Cited

U.S. PATENT DOCUMENTS

| 2,054,760 | 9/1936 | Oberhoffken | 408/42 X |
| 3,794,436 | 2/1974 | Rowlett | 408/42 X |

Primary Examiner—Travis S. McGehee
Attorney, Agent, or Firm—McGlew and Tuttle

[57] ABSTRACT

A multi-spindle drill head for use with a machine drive, comprises a main assembly, comprising a first housing member having at least one main spindle which is rotatably supported therein and which is adapted to be connected to the machine drive. A main gear is affixed to the main spindle for rotation therewith and it drives one or more secondary gears on secondary spindles. Each secondary spindle contains a drive pinion which becomes oriented in meshing engagement with a connecting gear which is rotatably mounted on a second housing part which is adapted to be fastened to the first housing part. The connecting gear is rotatably mounted in a position to drive a pinion of a drill spindle. The main spindle itself may contain a lower portion with a drive pinion which may be engaged with a connecting gear to drive the pinion of the drill spindle. One or more spindles may be arranged with an associated connecting gear on the second housing member and the connecting gears of each may be aligned with one or more secondary spindles or the main spindle itself for effecting a drive engagement therebetween.

12 Claims, 3 Drawing Figures

MULTI-SPINDLE DRILL HEAD

FIELD AND BACKGROUND OF THE INVENTION

This invention relates in general to drill constructions and, in particular, to a new and useful multiple-spindle drill head which is equipped with a main spindle and at least one secondary spindle indirectly drivable therefrom, and in which at least each of the secondary spindles drives at least one drilling spindle.

DESCRIPTION OF THE PRIOR ART

A multi-spindle drill head of this kind is known per se. It can be secured to a spindle sleeve of a conventional drilling machine and the drilling spindles may be equipped with drills of various lengths and diameters. The lateral spacing of the drilling spindles is predetermined, so that the hole pattern is exactly fixed. This pattern may be changed only to a very limited extent, for example, by equipped only a part of the drilling spindles with drills.

In other known multi-spindle drill heads, where a variation of the hole pattern is provided, this possibility of variation is again very limited. That is, in this known design, the drilling spindles can only be relocated along a circular path.

For drilling housings, machine parts, or the like, the holes to be drilled by a multi-spindle head in a single operation are frequently spaced very irregularly from each other and the suitable multi-spindle drill head must be designed correspondingly. If the construction of the part to be machined is to be subsequently changed, another drill head is needed. As a rule, however, multiple-spindle drill heads cannot be reconstructed at a reasonable cost, which makes it necessary to design and manufacture a new multi-spindle drill head.

SUMMARY OF THE INVENTION

The present invention is directed to a multi-spindle drill head having means to vary the hole pattern within large limits and which can be constructed at tolerably low costs.

In accordance with the invention, a multi-spindle drill head comprises a basic assembly which is employed in all instances without any change, independently of the required hole pattern. This assembly is then completed by a removable special part which is designed in accordance with the respective hole pattern required. For another pattern of holes, this special part is replaced by a new or modified part. The basic assembly which is suitable for many drilling operations can be manufactured in series, which results in a reduction of expenditures and represents a further advantage of this drill head.

In accordance with one of the inventive features, each drilling spindle is driven by a connecting gear which is mounted only on the lower part of the drill head casing. It is to be noted that due to the provision of a main spindle and one or more secondary spindles, the basic assembly offers a plurality of coupling possibilities for the drilling spindles. The connecting gears are arranged and dimensioned in a manner such that each drilling spindle is coupled to either the main spindle or to a secondary spindle. The arrangement may also be such that the main spindle, or one of the secondary spindles, drives more than one drilling spindle and that more than one intermediate or connecting gear is connected between the main spindle or a secondary spindle and the respective drilling spindle driven therefrom. The same applies to the basic assembly where the main spindle may drive a plurality of secondary spindles through an intermediate gear. On the other hand, it would also be possible to connect more than one connecting or intermediate gear between the main spinelde and any of the secondary spindles.

In particular instances, it may happen that one or the other of the drilling spindles extends coaxially of the main spindle or coaxially of one of the secondary spindles. In this case, of course, use of a connecting gear is unnecessary and the respective spindle or spindles may be connected to each other by means of a sleeve. This does not, however, change the fact that this multi-spindle drill head can also be later easily reconstructed by exchanging its special part with either the drilling spindles and/or the connecting gears, which are necessary for non-coaxial drilling spindles, for another special part of the drill head casing where all the drilling spindles are driven indirectly, through a connecting gear.

In a particularly preferred embodiment of the invention, each drilling spindle is driven through at least one separate connecting gear, i.e., no direct drive of the drilling spindles by the main spindle or a secondary spindle is provided here. By using at least one connecting gear for each transmission, the lateral spacing of the secondary spindles from the main spindles can be made relatively small. The relatively larger distance between the axis of the main spindle and the individual drilling spindles can be bridged by a single connecting gear in most instances, and in spite of the small distance of the secondary spindles from each other. As a matter of course, drilling spindles may also be provided within the area defined by the secondary spindles. In such a case also, at least one connecting gear is needed for their drive.

In a further development of the invention, each secondary spindle is connected to a main spindle through only one connecting gear, so that a relatively simple design of the basic assembly is obtained. In particular, the intention is to have the maximum possible number of gears of the basic assembly, and perhaps also of the special part, of identical design, in order to reduce the costs of manufacture in this respect also. Another possibility of reducing costs is to provide only one common intermediate gear between the gear of the main spindle and two secondary spindles. With such a design, two intermediate gears are sufficient for four secondary spindles.

Another development of the invention provides that, particularly if the main spindle and one of the drilling spindles and/or a secondary and a drilling spindle are coaxial of each other, the two spindles are provided with different gears on their ends facing each other, and the associated connecting gear of the respective drilling spindle is designed as a double-gear wheel with correspondingly toothed partial gears. In this way, the speed of the drilling spindle can easily be geared up or down.

It is particularly advantageous to mount each drilling spindle in a removable sleeve. Thus, upon a change of the hole pattern, the drilling spindle can be removed and put in place in a new cluster plate. This particularly reduces the costs of re-equipment. The same advantageously applies to the mounting of each connecting gear of the lower part of the drill head on a removable bolt so that these gears can also be used for the new special part.

Accordingly, an object of the invention is to provide a multi-spindle drill head for use with a machine drive, which comprises a main assembly which includes a first housing member having at least one main spindle rotatably supported thereon which has an end which is adapted to be connected to a machine drive, and which includes means defining at least one secondary drive pinion connected to the main spindle for rotation thereby and which is engageable with a connecting gear which is rotatably mounted on a second housing member which may be aligned with and secured to the first housing member and wherein at least one drill spindle is also rotatably mounted on the second housing member and engaged with the connecting gear so that is driven by the connecting gear when it is rotated by the drive pinion.

A further object of the invention is to provide a multi-spindle drill head for use with a machine drive which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF THE PREFERRED EMBODIMENT

Figure 1:
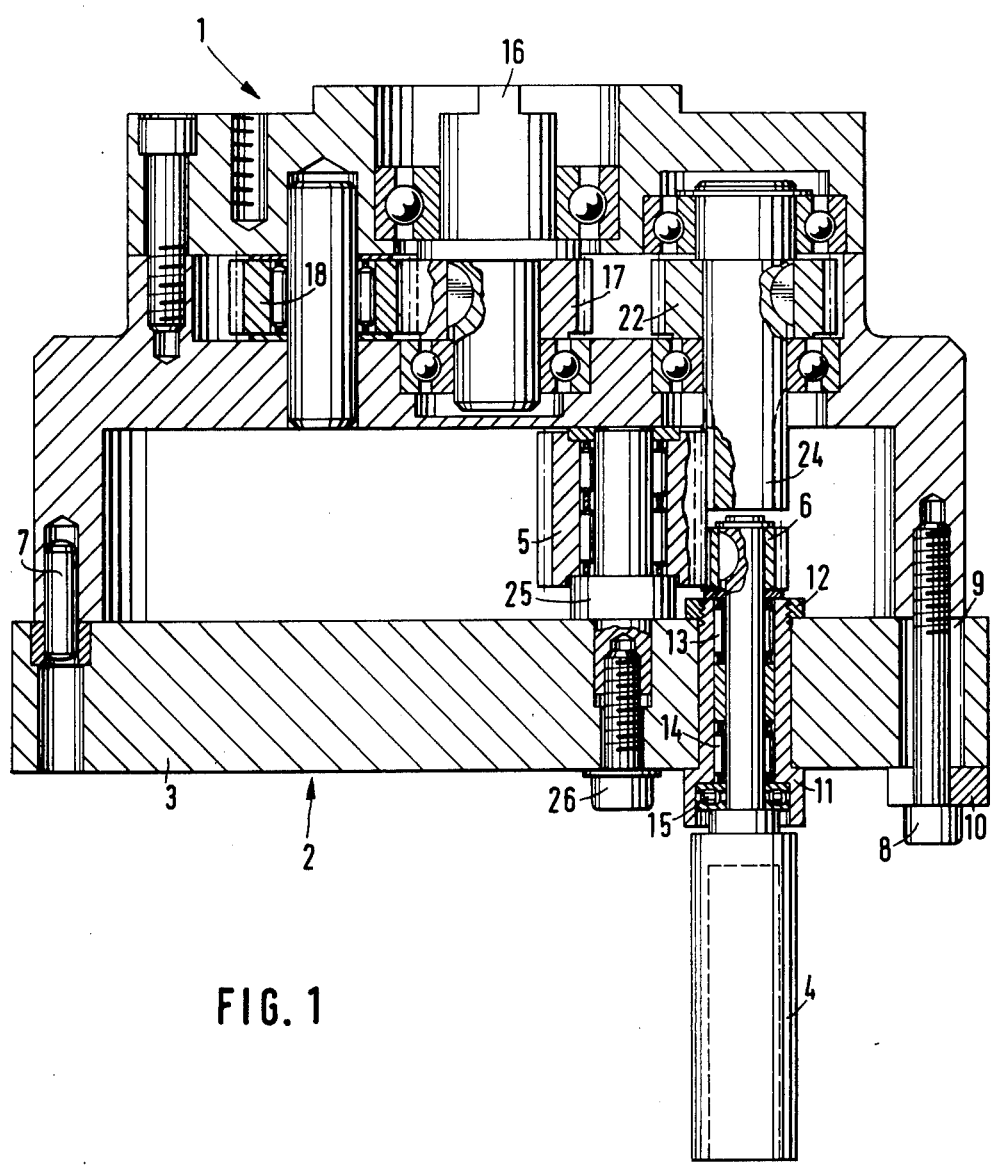
FIG. 1 is a central longitudinal sectional view of a multi-spindle drill head constructed in accordance with the invention.

Referring to the drawings in particular, the invention embodied therein, comprises a multi-spindle drill head for use with a machine drive which comprises a first housing member 50, which includes a main assembly 1, which is alignable with and connectable to a second housing member or plate 3. The housing member 50 provides a means for rotatably supporting at least one main spindle 16 which has an end which is adapted to be connected to the machine drive. Main spindle 16 is located to drive a plurality of secondary spindles or means defining at least one secondary drive pinion connected to the main spindle 16 for rotation thereby. In the embodiment shown, this may comprise a drive pinion or gear 27 formed at the lower end of the main spindle 16 itself, or it may comprise a plurality of other secondary spindles, such as spindles 19 and 20, which are driven through gears from the main spindle 16.

In accordance with the invention, the multi-spindle drill head comprises a so-called basic assembly 1 and a special part 2. In the embodiment shown, special part 2 comprises a plate 3 forming the lower part of the drill head casing in which various drilling spindles 4 are mounted for rotation in an arrangement corresponding to the desired pattern of holes. Each drilling spindle 4 is driven by a laterally off-set connecting gear 5 which is mounted for rotation only on lower part 3 of the drill head casing.

In the particular embodiment shown, the connecting gear 5 is a gear wheel meshing with a pinion 6 which is provided on the upper, inside end of the respective drilling spindle 4. The design may easily be such that one and the same connecting gear 5 drives two or more drilling spindles 4 simultaneously. Whether and when this is advantageous depends, assuming a predetermined design of basic assembly 1, only on the arrangement and number of drilling spindles 4.

To ensure a satisfactory engagement of the gears, basic assembly 1 and special part 2 are exactly aligned by means of set pins 7. The two parts of the drill head are held assembled by means of screws 8. In a particularly preferred embodiment of the invention, special part 2 is provided with assembly bores 9, the inside diameter of which is chosen so as to let pass the head of screws 8 therethrough. Then, lock members 10 are provided, against which the heads of screws 8 bear, and which are pivotable perpendicularly to the drawing plane or displaceable transversely to the longitudinal axis of the screw (not shown). The screw shank 8a extends through a slot 10a of lock member 10 with a minimum play.

Both the drilling spindles 4 and the connecting gears 5 are preferably mounted on lower part 3 of the drill head casing in a removable manner. For this purpose, sleeves 11 are provided for the drilling spindles, which are inserted from the underside of part 3 and fixed on the top side thereof by means of a ring 12. Advantageously, there sleeves 11 serve simultaneously as bearing sleeves for radial bearings 13 and 14 and for a thrust bearing 15.

Figure 2:
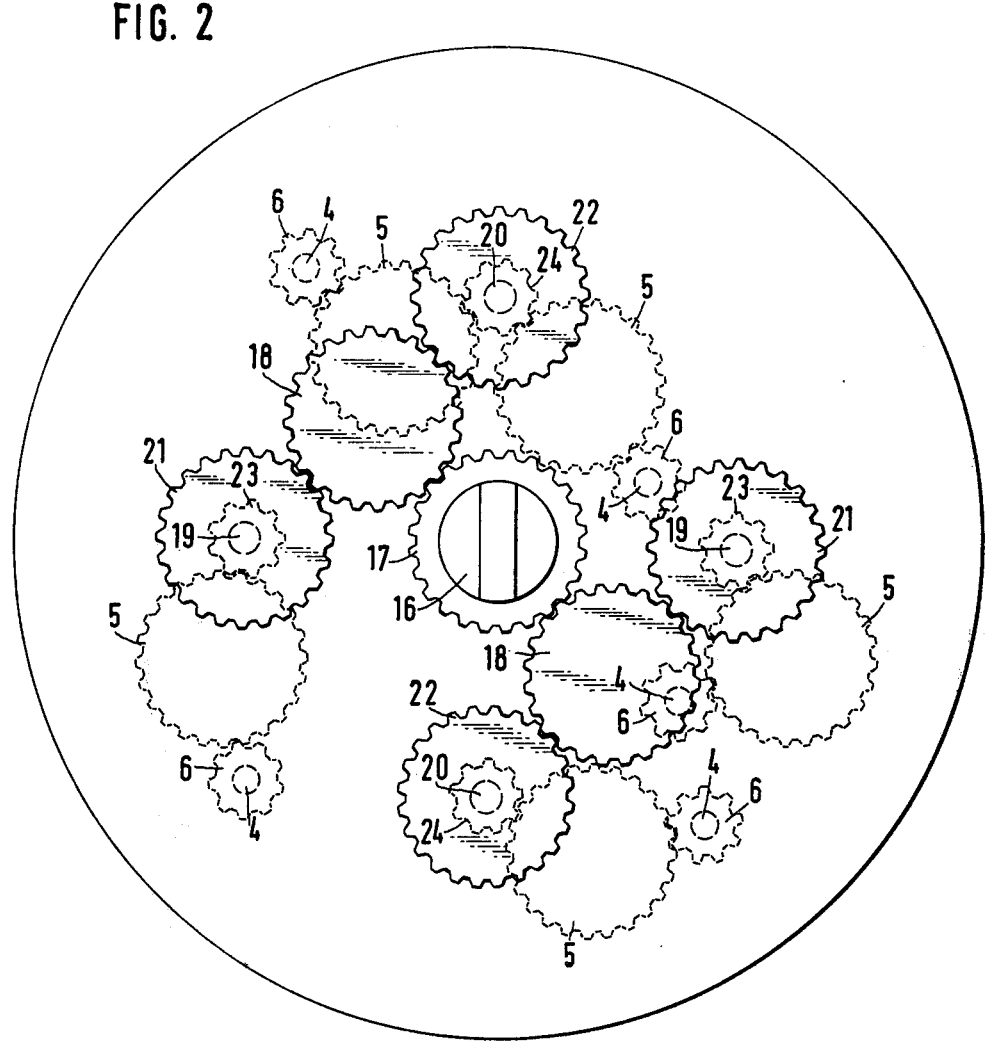
FIG. 2 is a diagrammatical top plan view of the drill head shown in FIG. 1.
Figure 3:
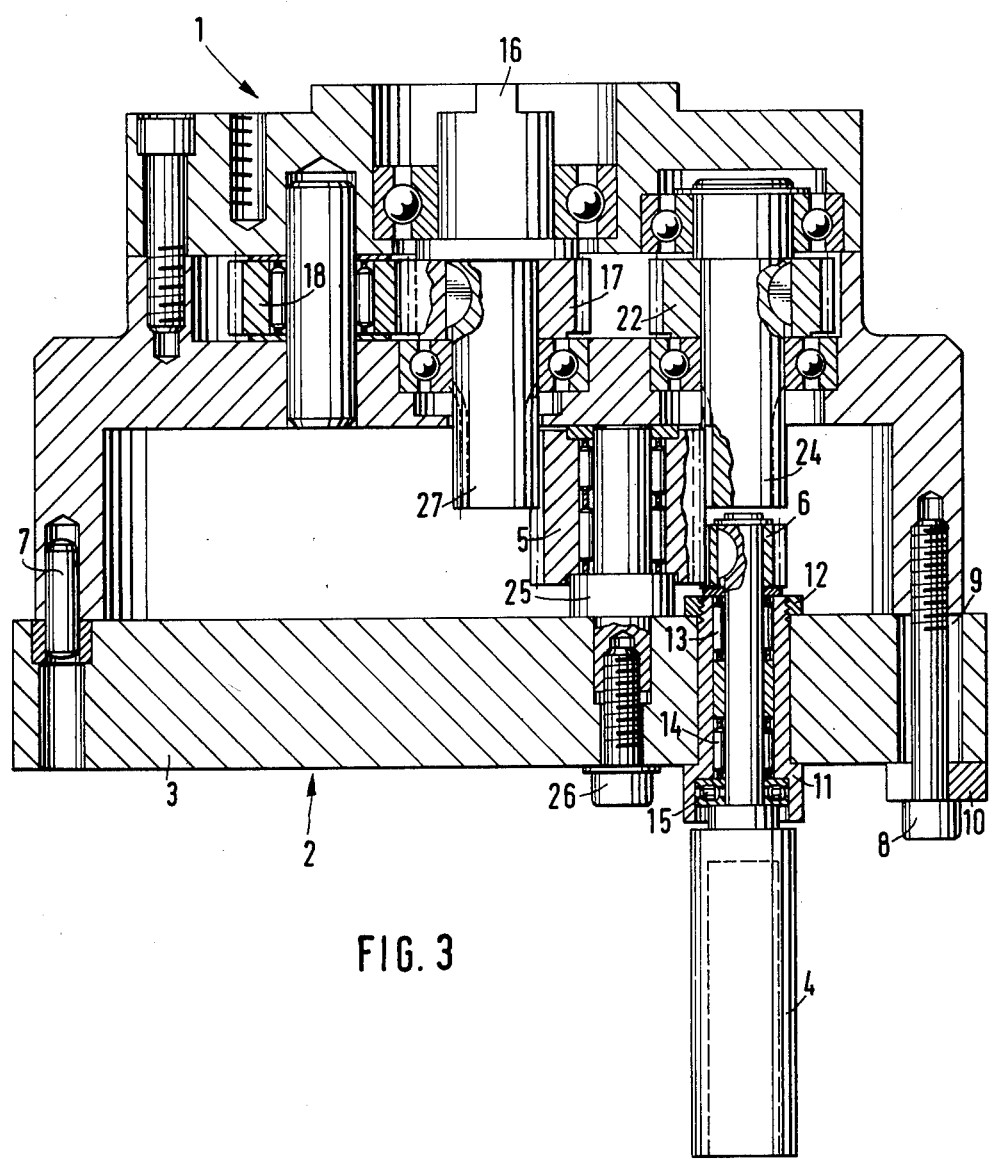
FIG. 3 is a view similar to FIG. 2 of another embodiment of the invention.

The inventive multi-spindle drill head is driven, in a conventional manner, by a spindle (not shown) of a drilling machine, which is directly connected to main spindle 16. Main spindle 16 carries a gear wheel 17 which meshes with one or more intermediate gears 18 which are mounted only on basic assembly 1 and, in turn, drive at least one secondary spindle 19, 20. In the embodiment shown, two intermediate gears 18 are provided, each imparting rotary motion to two secondary spindles 19 and 20. To this end, the teeth of intermediate gear 18 engage with the teeth of two gears 21 and 22 which are non-rotatably carried on their respective secondary spindles 19 and 20 and disposed at diametrally opposite sides of gear 18. On their lower ends, secondary spindles 19 and 20 carry pinions 23 and 24, respectively, which, consequently, are coaxial of gears 21 and 22. The teeth of pinions 23 and 24 engage with the teeth of the associated connecting gear or gears 5, thereby establishing connection to drilling spindles 4. In FIG. 2, for clarity, only one of the two intermediate gears 18 is indicated. The other intermediate gear meshes with the teeth of gear wheel 17 at a diametrally opposite location. Thus, the axes of the four secondary spindles 19, 20, of which only two are indicated in FIG. 2, are situated at the corners of a rectangle or square.

Connecting gears 5 are preferably mounted for rotation on bolts 25 which are fixed to lower part 3 of the drill head casing by means of an appropriately secured screw 26. A gear 27, of which only the left half is shown in FIG. 1, may be mounted or formed on the inside end of main spindle 16. This makes it possible for the main spindle to drive at least one of the drilling spindles 4 directly through a connecting gear 5. More drilling spindles may also be driven in this manner. It is further possible to provide a plurality of connecting gears 5 meshing with gear wheel 27.

In instances where a drilling spindle 4 is coaxial of main spindle 16 or of one of secondary spindles 19, 20, any connecting or intermediate gears can be omitted and a direct connection can be established by means of a coupling sleeve or the like. In such a case, of course, the speed of the respective drilling spindle must correspond to the required values.

While a specific embodiment of the invention has been shown and described in detail to illustrate the application of the principles of the invention, it will be understood that the invention may be embodied otherwise without departing from such principles.

What is claimed is:

1. A multi-spindle drill head for use with a machine drive, comprising a main assembly, including a first housing member, at least one main spindle rotatably supported on said first housing member and having an end adapted to be connected to the machine drive for rotation thereof, gear means defining at least one secondary drive pinion rotatably mounted on said first housing member and connected to said main spindle for rotation thereby, a second housing member, a connecting gear rotatably mounted on said second housing member, at least one drill spindle rotatably mounted on said second housing member and engaged with said connecting gear, and means for securing said second housing member to said first housing member in an orientation to position said connecting gear in driving engagement with said secondary drive pinion to drive said connecting gear from said drive pinion along with said drill spindle, said gear means defining said at least one secondary drive pinion comprising said main spindle having a drive pinion formed thereon, and a plurality of secondary spindles, each having a spindle gear engaged with said main spindle.

2. A multi-spindle drill head, as claimed in claim 1, wherein said drill spindle includes a gear connected thereon engaged with said connecting gear.

3. A multi-spindle drill head, as claimed in claim 1, including at least one main gear affixed to said main spindle for rotation therewith, at least one of said secondary spindle being supported on said first housing member adjacent said main spindle, a spindle gear on said one of said secondary spindles engaged with said main gear for rotation thereby, said main spindle having said drive pinion thereon engaged with said connecting gear.

4. A multi-spindle drill head, as claimed in claim 1, including a plurality of connecting gears arranged on said second housing member, a plurality of spindles on said second member having gears connected to respective ones of said connecting gears.

5. A multi-spindle drill head, as claimed in claim 1, wherein said drill spindles have drill spindle gears engaged with said connecting gears, said main spindle having a drive gear, said secondary spindles having secondary gears engaged with said drive gear having the same number of teeth and the same shape of teeth.

6. A multi-spindle drill head, as claimed in claim 1, wherein there are a plurality of drill spindles and including a separate connecting gear engaged with each drill spindle to rotate said drill spindle.

7. A multi-spindle drill head, as claimed in claim 1, wherein said plurality of secondary spindles are arranged around said main spindle, a main gear affixed to said main spindle, each secondary spindle having a secondary spindle gear engaged with said main gear.

8. A multi-spindle drill head for use with a machine drive, comprising a main assembly, including a first housing member, at least one main spindle rotatably supported on said first housing member and having an end adapted to be connected to the machine drive for rotation thereof, gear means defining at least one secondary drive pinion rotatably mounted on said first housing member and connected to said main spindle for rotation thereby, a second housing member, a connecting gear rotatably mounted on said second housing member, at least one drill spindle rotatably mounted on said second housing member and engaged with said connecting gear, and means for securing said second housing member to said first housing member in an orientation to position said connecting gear in driving engagement with said secondary drive pinion to drive said connecting gear from said drive pinion along with said drill spindle, and a plurality of secondary spindles rotatably supported on said first housing member around said main spindle, an intermediate gear rotatably mounted on said first housing member and engaged with said main gear, said gear means including at least two said secondary drive pinions engaged with said intermediate gear.

9. A multi-spindle drill head, as claimed in claim 8, including a plurality of drill spindles rotatably mounted on said second member, each of said drill spindles having a drill spindle gear engaged with said connecting gear.

10. A multi-spindle drill head, as claimed in claim 8, including a drill spindle sleeve mounted on said second housing member, said drill spindle being journalled in said sleeve.

11. A multi-spindle drill head, as claimed in claim 8, including a removable bolt carried on said second housing member, said connecting gear being rotatably mounted on said removable bolt.

12. A multi-spindle drill head, as claimed in claim 8, including a bearing sleeve extending through said second housing member, rotatable bearing means in said sleeve, said drill spindle being mounted on said rotatable bearing.

* * * * *